April 17, 1945.  J. G. HAWLEY  2,373,680
FLUID MOTOR
Filed Sept. 27, 1940

Inventor
Jesse G. Hawley,
By Albert T. St Clair
Attorney

Patented Apr. 17, 1945

2,373,680

UNITED STATES PATENT OFFICE 2,373,680

FLUID MOTOR

Jesse G. Hawley, Painted Post, N. Y.

Application September 27, 1940, Serial No. 358,711

3 Claims. (Cl. 60—54.6)

This invention relates to the art of power units, and more particularly to a fluid motor.

My present application is a continuation in part of the application for patent for brakes filed by me on August 15, 1934, and bearing Serial No. 739,850, which became Patent No. 2,247,374 on July 1, 1941, and provides a fluid motor of general application, which overcomes certain defects formerly experienced and found in fluid motors.

It is therefore the object of this invention to provide a new and improved fluid motor.

It is another object of the invention to provide a diaphragm actuating mechanism of general application.

It is a further object of the invention to provide a plurality of compression discs in the loops of the bellows forming a part of the diaphragm actuating mechanism for preventing the flattening out and subsequent breaking of the bellows at these points.

It is a special object of the invention to provide an improved hydraulic actuating mechanism for a brake.

With the above and other objects in view, which will be apparent as the description proceeds, I have set forth my invention in the following specification and have illustrated it in the accompanying drawing, in which.

Like characters of reference are used throughout the following specification and the accompanying drawing to designate corresponding parts.

Figure 1:
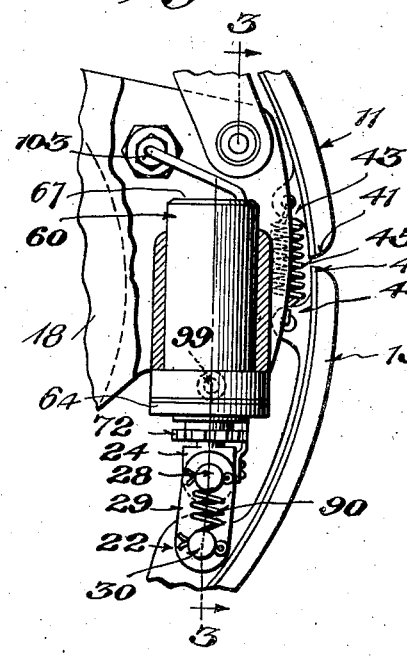
Figure 1 is a side elevation of my improved fluid motor, showing the same operatively associated with a brake mechanism.

In Fig. 1 of the accompanying drawing, I have shown my new fluid motor, comprising a diaphragm or bellows mechanism 16, used in connection with a brake 11 having the usual form of drum (not shown), a full floating brake shoe 15, and a spider 18. In this embodiment of my invention, the bellows 16 is used to expand the brake shoe into contact with a brake lining (not shown) when the brake is being applied.

The brake shoe 15 is provided with a pair of bosses 22, and the diaphragm or bellows mechanism 16 includes an adjusting screw 24, which is pivoted at 28 to a pair of links 29 pinned to boss 22 by a stud 30.

The free ends 40 and 41 of the brake shoe are united by a retracting spring 45, which is secured to small lugs 44 and 43 near the ends 40 and 41, respectively.

As clearly illustrated in the several figures, the diaphragm or bellows mechanism 16 comprises a cylinder 60, which is suitably and firmly mounted within the brake spider 18. Housed in cylinder 60 is a diaphragm or bellows 62 that is closed at its inner end by a head 63, and at its outer end is rigidly connected, as by soldering or brazing, to a head 64. The diaphragm or bellows head 63 is provided with projections 66, which normally rest against the closed end or head 67 of cylinder 60, but the main portion of the head 63 is permanently spaced therefrom to allow an actuating fluid to bear thereagainst. Similarly, the convolutions or loops 68 of the diaphragm or bellows are spaced from the walls of the cylinder. In its movement within the cylinder, the diaphragm is guided by a hollow pin 69 carried by the cylinder head 67, and the head 63 of the diaphragm forms the inner end of a plunger 70.

The opposite end 71 of the plunger abuts against an adjusting nut 72, which is provided with a threaded recess 73 to receive a correspondingly threaded portion 74 of the adjusting screw 24, which is provided with a portion 75 of reduced diameter that is telescoped into a recess 76 in the plunger 70. At its outer end recess 76 is enlarged at 77 to freely receive part of the threaded portion 74 of the adjusting screw 24. The outer end of the adjusting screw terminates in a head 78 that is perforated to receive the pivot 28.

The adjusting nut 72 is spaced from cylinder head 64 by a sleeve 80 which is rigidly secured to the head 64 in any convenient way, as by spot welding. The adjacent end of cylinder 60 is positioned between a collar 81 and cylinder head 64 in any suitable manner, as by spot welding.

Figure 3:
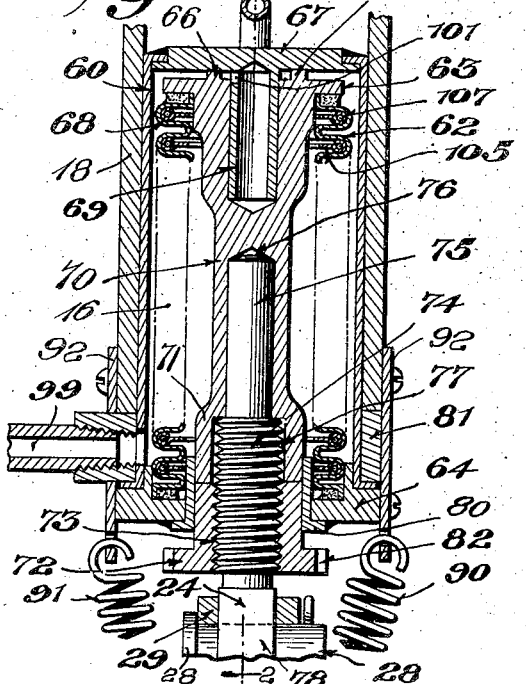
Fig. 3 is an enlarged longitudinal section through my improved fluid motor on the line 3—3 of Fig. 1, showing the bellows with compression discs within the loops, and further showing the position of the fluid inlet nipple and bleeder outlet pipe.
Figure 4:
Fig. 4 is a further enlarged section through a portion of the bellows showing the compression discs received within the adjacent loops of the bellows.
Figure 5:
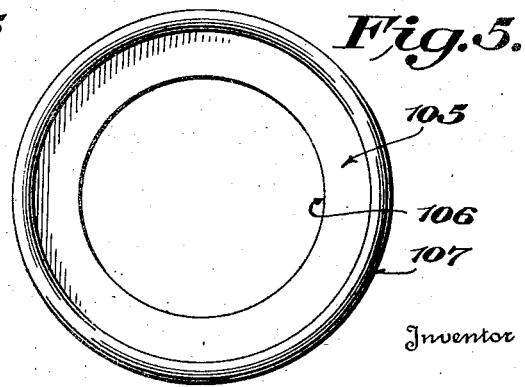
Fig. 5 is a plan view of one of my improved compression discs.

As clearly illustrated, adjusting nut 72 is provided with a series of peripheral recesses 82 for selective engagement by a spring lock 83 secured to the side of head 78 of adjusting screw 24. The spider 18 is yieldingly connected to the boss 22 on the brake shoe by a pair of return springs 90 and 91, connected at one end to the stud 30 and at the opposite end to a pair of plates 92 secured to the upper and lower faces of the spider 18, as shown in Figs. 1 and 3.

The operating fluid, such as oil or air under pressure, is fed to the diaphragm or bellows mechanism 16 through the inlet nipple 99 extending into the cylinder 60 externally of the diaphragm 62. The fluid normally fills this chamber, including the portion between the end 63 of the diaphragm mechanism and the cylinder head 67. It is also free to pass into the hollow pin 69, carried by cylinder head 67, through openings 101 therein.

Upon actuation of the brake pedal (not shown) or other actuation inducing means, the fluid displaced from a master cylinder (not shown) enters cylinder 60 and acts against the end 63 of plunger 70 to cause it to slide outwardly on the hollow pin 69 carried by the cylinder head 67, thus partially compressing the diaphragm 62. The outward movement of the end 71 of the plunger, acting against the abutting surface of the adjusting nut 72, forces the adjusting screw 24 outwardly and, since this is secured to the links 29, the end 40 of the brake shoe 15 will be forced into engagement with the brake lining (not shown) to press it tightly against the brake drum (not shown), thus applying the brake.

When the brake is released, the retracting spring 45, connecting the ends of brake shoe 15, withdraws the ends 40 and 41 from the lining and drum, and return springs 90 and 91 then force the adjusting screw 24 inwardly and return the end 63 of the diaphragm mechanism to its seat against the cylinder head 67, thus forcing fluid out of the cylinder 60 and back into the master cylinder (not shown).

Figure 2:
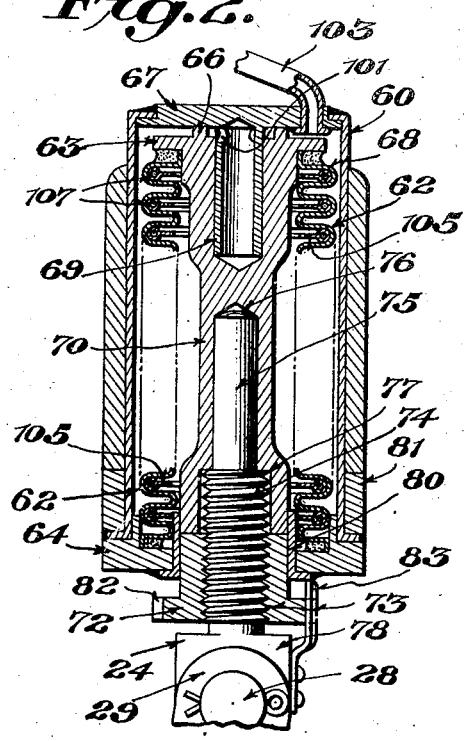
Fig. 2 is an enlarged transverse section through the fluid motor on the line 2—2 of Fig. 3, showing the position of the bellows with compression discs received within the loops thereof.

I also provide a bleeder of any conventional type which will be connected with the cylinder 60 through a pipe 103, as shown in Figs. 1, 2, and 3.

Through the provision of the adjusting nut 72, it will be obvious that the normal position of the brake shoe 15 with respect to its brake lining and drum may be varied so that, if the lining becomes worn, the ends 40 and 41 of the brake shoe may be spread farther apart by merely turning the adjusting screw 72 until the desired relationship between the brake shoe, lining and drum is obtained, after which the spring lock 83 will retain the adjusting nut in the desired position.

The diaphragm or bellows mechanism 16 for actuating a brake or other apparatus provides an effective means of securing high actuating power without the complications incident thereto in piston and cylinder operation. Furthermore, by having the actuating fluid on the outside of the convolutions or loops 68 of the diaphragm or bellows, the latter tends to resist distortion even under the application of exceedingly heavy pressure.

I have found that by providing compression discs 105 of approximately the same external diameter as the internal diameter of the loops 68 of bellows 16, and successively inserting one in each loop 68 as the loops are formed, the said loops will be kept from flattening out when the bellows are compressed by pressure exerted on the outside of the bellows. This prevents loss of spring action when the loops are compressed together and eliminates the danger of breaking at the fold points.

The discs 105 may be stamped out from sheet metal, and will be centrally apertured, as at 106, to provide an opening having more or less the same size and diameter as the bore of the bellows 16, but in any event large enough to avoid interference with the plunger 70. Each compression disc 105 will be further formed with a curled peripheral bead 107, which will be received within the loops 68 of the bellows 16, to conform to the contour of the said loops and reinforce them.

From the foregoing description, it will be apparent that by the utilization of the compression discs within the loops of the diaphragm or bellows, the whole assembly is strengthened and reinforced, and the element of wear and breakage is definitely eliminated.

It will therefore be apparent that I have developed a new and useful fluid motor of general application, although it is highly useful for the actuation of brakes, and that my fluid motor will resist distortion even when subjected to heavy pressure, and will not be subject to breakage through successive flattening out and releasing during long continued use.

As many apparently widely different embodiments of this invention may be made without departing from the spirit thereof, it is to be understood that I do not limit myself to the foregoing embodiments or description except as indicated in the following claims:

I claim:

1. A diaphragm mechanism for operating a brake, comprising a closed cylinder, a metallic diaphragm bellows therein closed at both ends and adapted to be actuated by an external operating fluid, and rigid compression discs in the loop portions of said diaphragm bellows for reinforcing said loop portions, said compression discs each being apertured and formed with a peripheral bead.

2. A diaphragm mechanism for operating a brake, comprising a closed cylinder, a metallic diaphragm bellows therein closed at both ends and adapted to be actuated by an external operating fluid, and rigid compression discs in the loop portions of said diaphragm bellows for reinforcing said loop portions, said compression discs each being apertured and having an integrally formed peripheral bead.

3. A diaphragm mechanism for operating a brake, comprising a closed cylinder, a metallic diaphragm bellows therein closed at both ends and adapted to be actuated by an external operating fluid, and a plurality of stamped rigid compression discs inserted in the loop portions of said diaphragm bellows for reinforcing said loop portions, said compression discs each being formed with a central aperture of approximately the same size as the bore of the bellows, and with peripheral beads adapted to be received within adjacent loops, whereby breaking of the loops at their bending points is eliminated.

JESSE G. HAWLEY.